May 31, 1927.
E. V. HILL
THERMOMETER SCALE
Filed June 1, 1925
1,630,341
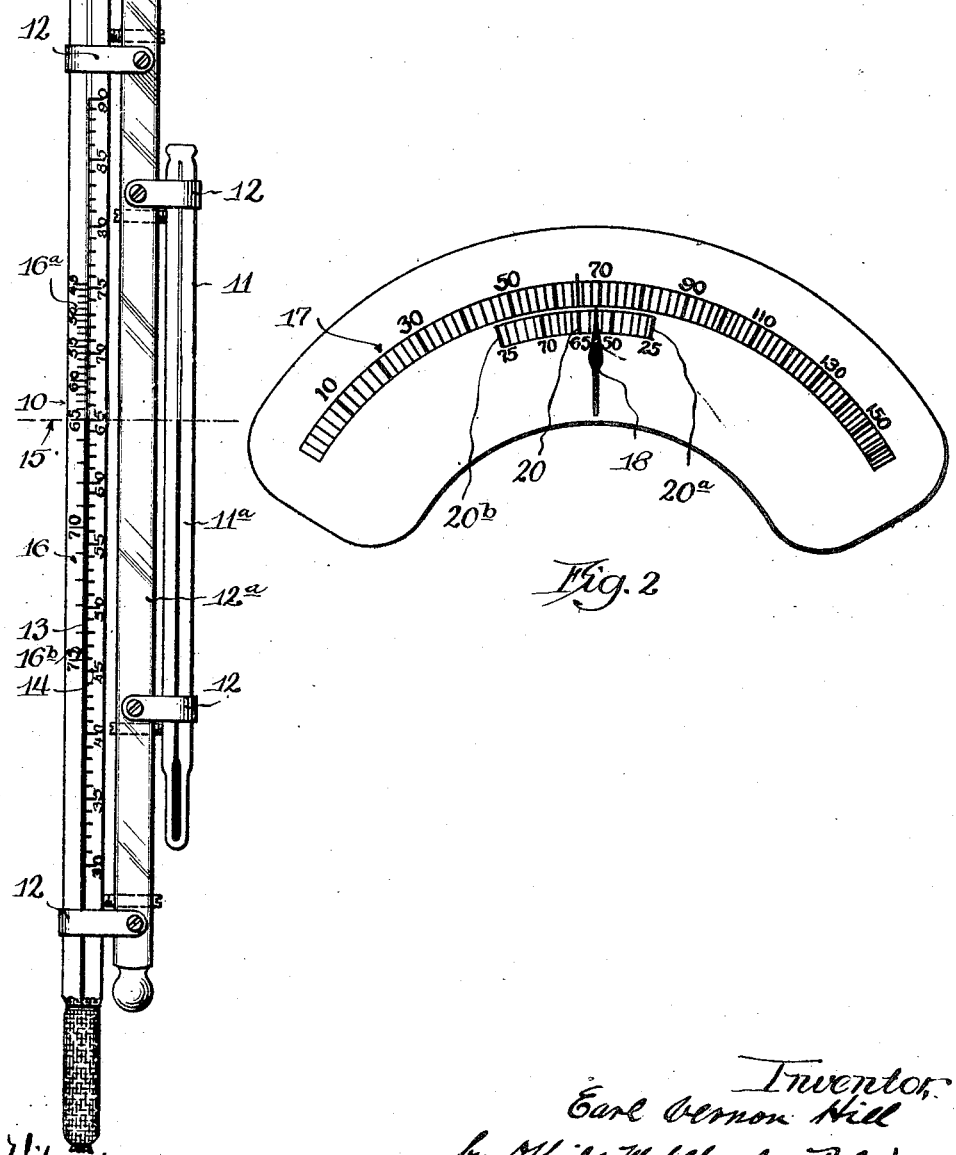

Patented May 31, 1927.

1,630,341

UNITED STATES PATENT OFFICE.

EARL VERNON HILL, OF CHICAGO, ILLINOIS.

THERMOMETER SCALE.

Application filed June 1, 1925. Serial No. 33,959.

This invention relates to a novel and improved scale for thermometers and consists of the matters hereinafter described and more particularly pointed out in the appended claims.

The improved scale is primarily designed for use on or in connection with thermometers and with apparatus for properly conditioning the air as to heat and as to moisture content, in buildings, residences and the like; but it is equally capable of use in connection with other measuring devices and with apparatus where a predetermined or desirable relation of two inversely related conditions are to be brought about and maintained.

It is well-known that the comfort of the human body, for example, in so far as the heat of the surrounding air affects it, depends largely on the moisture in the air, as well as upon the temperature of the air,— the two being related in this respect inversely. Thus air at a relatively low temperature containing a relatively high amount of moisture is just as comfortable to the human body and has the same temperature effect thereon as air at a relatively high temperature containing a relatively low amount of moisture. The more moisture the air contains up to the point of saturation, the lesser degree of temperature to which it has to be raised in order to produce a maximum of comfort; whereas, the drier the air, the higher the temperature to which the air has to be raised in order to produce a corresponding maximum of comfort.

Careful tests have been made by the use of wet bulb and dry bulb thermometers in rooms where the condition of the air as to moisture has been varied from substantially dry air to saturated air with varying degrees of temperature and the corresponding readings of the two thermometers required to produce a maximum of comfort have been noted. It has been found that air saturated with moisture at a temperature of about 65° Fahrenheit represents generally a maximum of comfort for the human body. In such air, the readings of the dry bulb thermometer and of the wet bulb thermometer are substantially identical, namely, 65° F. Above this reading as to temperature, the correspondingly diminishing readings of the wet bulb thermometer in air suitably conditioned for comfort as to moisture have been determined.

The object of the present invention, as applied, for use in connection with apparatus for properly conditioning the air as to temperature and moisture in households, buildings, and the like, is to produce a combination scale of thermometer readings by means of which the readings of the scale of the dry bulb thermometer are so correlated with the readings of the scale of the wet bulb thermometer, that with a reading of the scale of either the wet bulb or dry bulb thermometer, the proper reading of the other, for a predetermined or desirable maximum of comfort in the temperature effect of the surrounding air may be instantly and accurately read on the other scale. Thus, the amount of moisture or temperature change in the surrounding air to reach the predetermined relation of desirable or maximum comfort is at once made known.

The advantages of my invention will appear more fully as I proceed with my specification.

In the drawings:—

Figure 1 is a side elevation showing my improved scale as applied to the usual dry bulb mercury thermometer.

Figure 2 is a view representing a modified form of the scale, as applied to a different type of thermometer.

In illustrating my invention, as it appears in Figure 1, I have shown my improved scale applied to an ordinary wet bulb liquid (specifically mercury) thermometer. To this is preferably attached a small dry bulb thermometer, although this is not essential, as the one thermometer may be used for both readings and the second thermometer is only used to retain the normal dry reading.

Referring now to the drawings:—10 indicates a thermometer of any standard type capable of use as a wet bulb thermometer, and 11 indicates a small dry bulb thermometer, both attached to a bar 12 by metal clamps 12, 12. 10$^a$ indicates the usual handle at the top of the bar 12$^a$ for swinging the wet bulb thermometer through the air in a familiar manner. The dry bulb thermometer bears the usual thermometer scale of graduations indicated at 11$^a$, said graduations corresponding to like graduations on the thermometer 11, but being on a smaller scale.

14 indicates the scale of the thermometer 11, (to the right of a vertical line 13) being the normal scale of graduations corresponding to the ordinary degrees of temperature indicated by the rise of the mercury in the tube of the thermometer. 15 indicates a horizontal line opposite the graduation corresponding to 65° of temperature on the scale 14. On the other side of the vertical line 13 are provided a series of graduations 16, above and below the line 15, which line itself bears the numeral 65,—that is to say, the same degree as on the regular thermometer scale. This is the graduation to which the mercury should rise in saturated air, if such air be at the maximum temperature for the comfort of the human body as determined by the experiments heretofore referred to, whether the thermometer 10 is used as a dry bulb thermometer or whether it is used as a wet bulb thermometer. Above the mark 15, noted as 65° on the scale, to the left of the line 13, a scale of graduations 16$^a$ is made, which graduations diminish from 65° numerically upwardly, and indicate the correspondingly diminishing wet bulb readings that should maintain for the predetermined maximum comfort at the readings on the right-hand scale of the thermometer 10 as a dry bulb thermometer. Below said mark 15, a scale of graduations 16$^b$ is made, which graduations increase from 65° numerically upward and indicate the increasing dry bulb readings which should maintain for comfort at the several corresponding readings on the right-hand scale of the thermometer 10 as a wet bulb thermometer. Thus, when used as either a dry bulb or a wet bulb thermometer, the desirable reading of the other, wet or dry, for the predetermined maximum comfort, may be noted at a glance.

If the thermometer 10 is used as a dry bulb thermometer and the temperature of the surrounding air is shown in the thermometer scale 14 to be 70°, then in order that there be the desired maximum comfort to the human body, the moisture in said air should be such that, when the thermometer is used as a wet bulb thermometer, it should register 56°.—this reading appearing upon the scale 16$^a$ on the left-hand side of the line 13, and being the graduation on that scale opposite the graduation 70 on the scale 14 on the right-hand side of said line. And, if the actual wet bulb reading on the scale 14 be above or below 56°, the moisture in th air should be decreased, if above, or increased, if below; or if that is not practicable, the temperature of the room should be lowered to bring the temperature of the air to a degree corresponding to the actual wet bulb reading, namely 56°.

When the thermometer is used as a wet bulb thermometer for air below saturation, which is the usual condition of the air, a reading on the right-hand scale 14 will give the actual wet bulb thermometer temperature. Opposite that reading and on the left-hand scale 16$^b$ will appear the corresponding temperature reading, which the thermometer, when used as a dry bulb thermometer, should show for maximum comfort, with the air at the point of relative saturation indicated by the wet bulb thermometer reading.

For example, if the wet bulb reading on the scale 14 be 58°, it will be noted by reading the scale 16$^b$, that the graduation 69° corresponds on that scale to the graduation 58° on the scale 14. This indicates that the temperature of the surrounding air for the desired maximum comfort should be 69°; and if it is not, said temperature should be brought to that degree in order to produce the maximum feeling of comfort herein referred to.

In illustrating the invention, as in Figure 1, I have shown the scale as applied to the usual liquid (specifically mercury) thermometer, in which the top end of the body of liquid, by its rise and fall in the tube, is the indicator, and the scale is laid out along a straight line. But manifestly, the new scale is applicable to other thermometers or other temperature indicating devices, in which a swinging needle or pointer constitutes the indicator, with the end of the needle traveling upon an arcuate scale, as in the case of thermometers which depend for their operation on the differential expansion of metal ribbons of different co-efficients of expansion, or others which depend for their operation upon the flow of a known current of electricity through a material, the resistance of which changes with the temperature.

In Figure 2, I have shown the novel scale as applied to a thermometer bearing a scale in arcuate formation and readable by the position of a swinging pointer or needle. In this case, the regular thermometer scale is indicated by the numeral 17,—this being a normal scale of graduations in accordance with degrees of variation of temperature, as indicated by the travel of the needle 18. Said graduations increase numerically from left to right. Opposite this scale 17 and on the side, as shown, nearer the center of the arc, is a second scale in which a graduation 65 at 20 is placed to correspond to the graduation 65 on the normal thermometer scale 17. To the right, in the direction of the numerically increasing degrees of graduations on the scale 17, a scale of graduations 20$^a$ is made, which indicate the correspondingly diminishing wet bulb readings, which should maintain for maximum comfort at the readings on the outer, normal scale 17, corresponding to readings of a dry bulb thermometer. To the left of the graduation 65 at 20, a scale of graduations 20$^b$ is made, which graduations increase from 65 numerically and indicate the increasing dry bulb readings, which should maintain for maximum comfort at the readings on the outer normal scale 17, corresponding to readings of a wet bulb thermometer.

The two foregoing illustrations of the application and use of the improved scale show its operation and advantages, and its wide application in connection with the many different system of temperature and air-moisture-content control in use with furnaces, boilers and other heating and ventilating apparatus for properly and comfortably heating buildings, both domestic and commercial, as well as in connection with other heating or temperature conditioning apparatus, where the moisture content of the air, as well as the temperature, are to be related in a predetermined desirable way.

While in describing my novel scale as above, I have selected the degree of 65° F. as the basis or dividing line between the scales 16$^a$ and 16$^b$ or 20$^a$ and 20$^b$, that being the degree of temperature to which moisture saturated air has been determined to provide a maximum of comfort to the human body, other degrees, either above or below 65°, may be used as the basis, depending in cases of heating buildings or houses, upon the activities of those habitually using said buildings or houses. For examples, the degree used for illustration will be desirable for those who are generally in sedentary, non-active pursuits; but where the occupants are actively engaged, as in a gymnasium, a different degree should be selected as the basis of the scale, in order to produce the desired comfort as to be indicated by the scale.

In the same way, when the condition as to desirable correlated heat and moisture conditions of the air are to be brought about with respect to things rather than to the human body, a still other degree would be selected on the normal thermometer scale to correspond with the reading 65, corresponding on both wet bulb and dry bulb thermometers to the maximum of comfort in the experiments hereinbefore referred to.

Likewise, it will be manifest that even when designed to meet the requirements as determined by said experiments, the scale may be modified according to other thermometers, as for example, centigrade.

I claim as my invention:—

1. A combination scale for indicating two conditions to be correlated in predetermined inverse relation, each condition being registerable on the same scale, comprising a main scale for determining either of the conditions, but normally for determining the first condition, said scale reading in one direction, a second scale with a base graduation of predetermined degree as affected by the second condition placed opposite the graduation of the first scale and of the same degree of the first condition corresponding to the predetermined correlation of the two conditions to be maintained, said second scale being graduated in the direction of the reading of the first scale to indicate the diminishing degrees of the second condition corresponding to the respective numerically increased readings of the first scale when indicating the first condition, and said second scale being graduated in the reverse direction from said base graduation to indicate the numerically increasing degrees of the first condition corresponding to the respective opposite readings of the first scale when indicating the second condition.

2. A combination thermometer scale for indicating temperature and moisture conditions of air to be correlated in predetermined relation, comprising a thermometer scale for determining either of the conditions, said scale reading in one direction, a second scale with a base graduation of predetermined degree as affected by the moisture condition, placed opposite the graduation of the first scale and of the same degree of temperature corresponding to the said predetermined correlation of moisture and temperature to be maintained, said second scale being graduated in the direction of the reading of the first scale to indicate the numerically diminishing degrees of a wet bulb reading corresponding to the respective numerically increasing readings of the first scale indicating temperature, and said second scale being graduated in the reverse direction from said base graduation to indicate the numerically increasing degrees of temperature corresponding to the respective opposite readings of the first scale when indicating wet bulb readings.

3. A combination scale for indicating two conditions to be correlated in predetermined inverse relation, each condition being registerable on the same scale, comprising a main scale for determining either of the conditions, but normally for determining the first condition, said scale reading in one direction, a second scale with a base graduation of predetermined degree as affected by the second condition placed opposite the graduation of the first scale and of the same degree of the first condition corresponding to the predetermined correlation of the two conditions to be maintained, and said second scale being graduated in the direction of the reading of the first scale to indicate the diminishing degree of the second condition corresponding to the respective numerically increasing readings of the first scale when indicating the first condition.

4. A combination thermometer scale for indicating temperature and moisture conditions of air to be correlated in predetermined relation, comprising a thermometer scale for determining either of the conditions, said scale reading in one direction, a second scale with a base graduation of predetermined degree as affected by the moisture condition placed opposite the graduation of the first scale and of the same degree of temperature corresponding to the said predetermined correlation of moisture and temperature to be maintained, and said second scale being graduated in the direction of the reading of the first scale to indicate the numerically diminishing degrees of a wet bulb reading corresponding to the respective numerically increasing readings of the first scale indicating temperature.

5. A combination scale for indicating two conditions to be correlated in predetermined inverse relation, comprising a main scale for registering either of the two conditions but normally for registering the first condition, a second scale with a base graduation of predetermined degree as affected by the second condition placed opposite the graduation of the first scale and of the same degree of the first condition corresponding to the predetermined correlation of the two conditions to be maintained, and said second scale bearing graduations which are numbered inversely with respect to the numbering of the first scale with the opposite graduations of the two scales indicating the respective degrees of the two conditions required to correlate said conditions in the said predetermined inverse relation.

6. A combination thermometer scale for indicating temperature and moisture conditions of air to be correlated in predetermined inverse relation, comprising a thermometer scale for registering either of the conditions but normally for registering the first condition, a second scale with a base graduation of predetermined degree as affected by the moisture condition placed opposite the graduation of the first scale and of the same degree of temperature corresponding to the predetermined correlation of moisture and temperature to be maintained, and said second scale bearing graduations which are numbered inversely with respect to the numbering of the first scale with the opposite graduations of the two scales indicating the respective readings as to moisture and temperature required to correlate said moisture and temperature conditions in the said predetermined inverse relation.

7. A combination scale comprising a main scale with graduations to represent degrees numerically increasing in one direction and a second scale placed opposite the first scale, the two scales having one graduation of like numerical order common to the two scales, and the second scale running inversely from the common graduation and bearing graduations which are correlated in a predetermined inverse relation to the corresponding graduations on the other scale, said predetermined inverse relation corresponding to a correlation of two conditions to be maintained as registered on the two scales.

8. A combination scale comprising one scale bearing graduations running numerically in one direction, and a second scale placed opposite said first scale, the two scales have one graduation of like numerical order common to both, the second scale bearing graduations running in each direction from said common graduation, said graduations numerically decreasing from said common graduation in the direction in which the graduations of the first scale increase and numerically increasing in the opposite direction, and the graduations of the two scales being correlated in a predetermined inverse relation, said predetermined inverse relation corresponding to a correlation of two conditions to be maintained as registered on the two scales.

9. The combination with a temperature measuring device, a combination scale thereon comprising two sets of graduations, with one graduation of like numerical order common to the two scales, the one set of graduations numerically increasing in one direction corresponding to the movement of the indicator in accordance with varying degrees of temperature, and the other scale running inversely from the common graduation, the two scales indicating wet and dry bulb readings which are correlated in a predetermined inverse relation.

10. A method of determining comfort conditions of the surrounding air as to moisture and temperature by means of associated wet and dry bulb scales applied to a temperature measuring or indicating device, the said scales bearing graduations which are correlated to correspond with a predetermined desirable inverse relation of the moisture and temperature of said air.

In testimony that I claim the foregoing as my invention, I affix my signature this 29th day of May, A. D. 1925.

EARL VERNON HILL.